Oct. 30, 1962 W. W. ELVES 3,061,033
POWER TAKE-OFF
Filed June 12, 1961 2 Sheets-Sheet 1
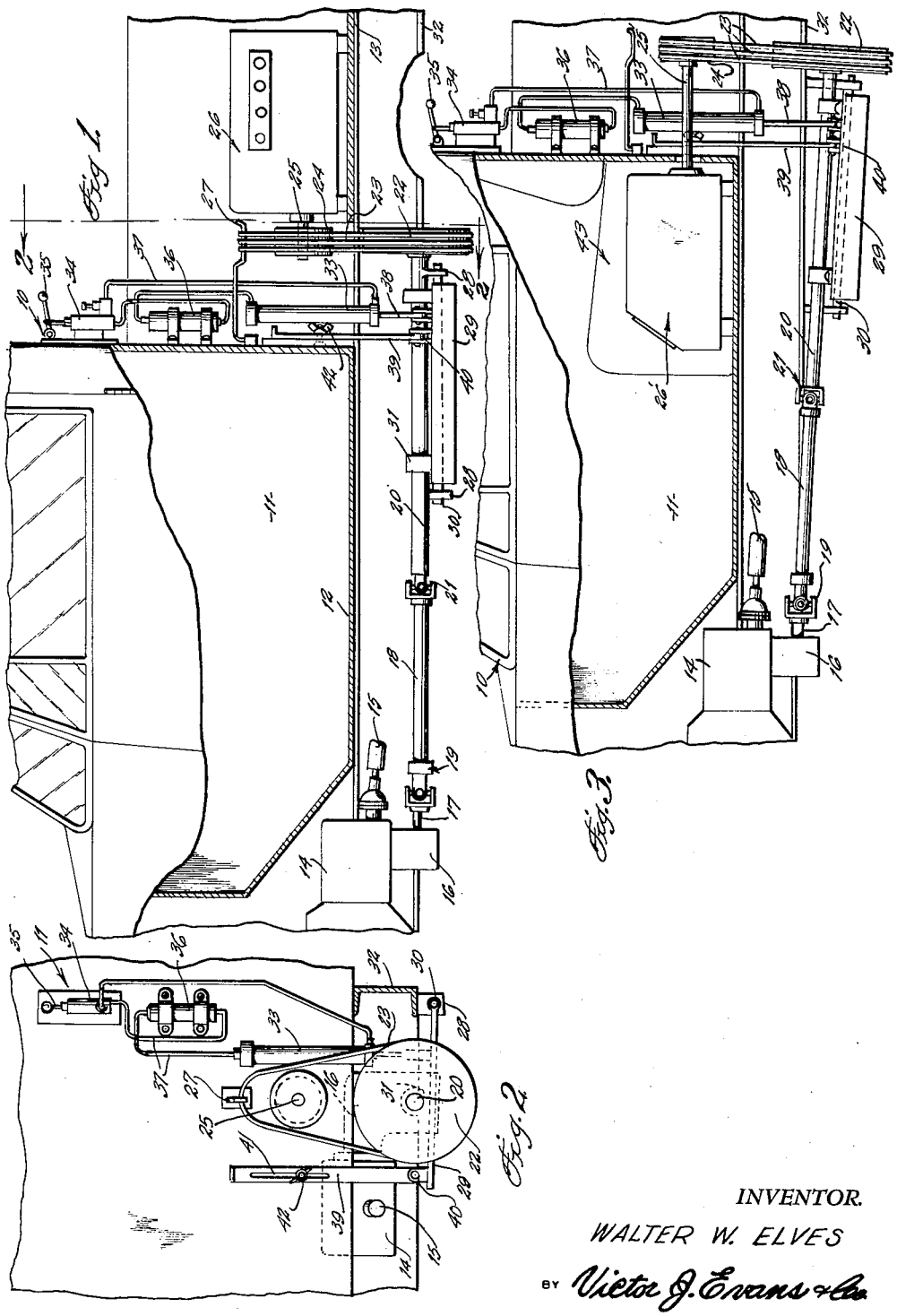
INVENTOR.
WALTER W. ELVES
BY *Victor J. Evans & Co.*
ATTORNEYS Oct. 30, 1962  W. W. ELVES  3,061,033
POWER TAKE-OFF
Filed June 12, 1961  2 Sheets-Sheet 2
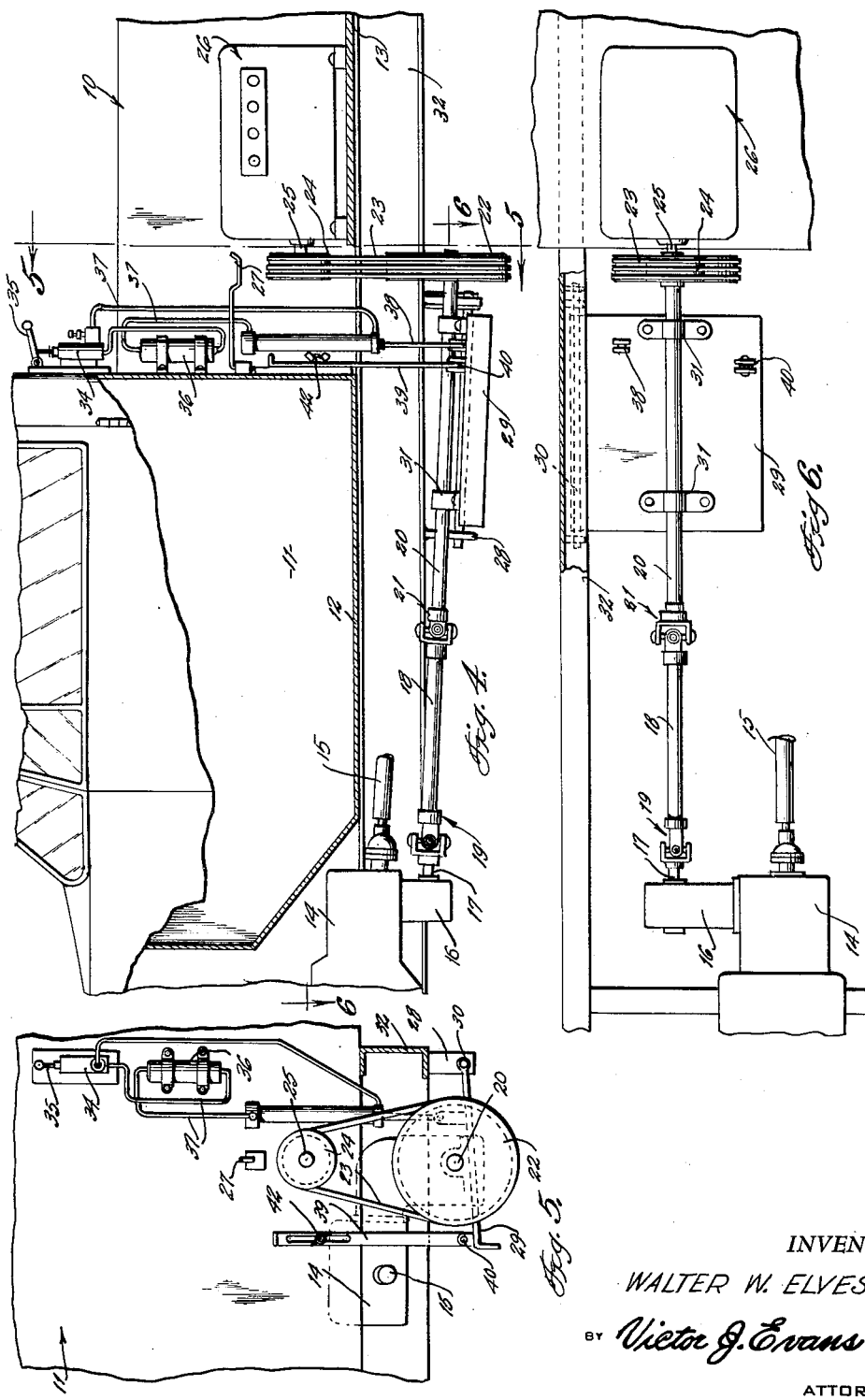
INVENTOR.
WALTER W. ELVES
BY *Victor J. Evans & Co.*
ATTORNEYS

United States Patent Office 3,061,033
Patented Oct. 30, 1962

3,061,033
POWER TAKE-OFF
Walter W. Elves, Rte. 2, Box 2667–A, Woodinville, Wash.
Filed June 12, 1961, Ser. No. 116,582
2 Claims. (Cl. 180—53)

This invention relates to a driving connection between a power source and a mechanism to be driven or powered.

The object of the invention is to provide a means for operating a piece of equipment such as an electric welder, generator or the like, whereby such equipment can be conveniently operated from a power take-off such as the power take-off of a truck or other vehicle.

A still further object of the present invention is to provide a means for driving or operating various types of equipment such as welding equipment by means of a power take-off from a truck or other vehicle.

Another object of the invention is to provide a driving connection between a power take-off and a generator or piece of equipment which is to be operated, and wherein there is provided a means for raising or lowering the driving connection so that for example when the vehicle is being driven along a highway or the like, the driving connection is adapted to be moved to a raised position so that there will be sufficient clearance as the vehicle moves, and when the vehicle is parked or stationary, the driving connection can be conveniently moved to lowered position.

A further object of the invention is to provide a driving connection which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a fragmentary sectional view showing a vehicle equipped with the present invention, and showing the parts in raised position.

FIGURE 2 is a sectional view taken on the line 2—2 of FIGURE 1.

FIGURE 3 is a fragmentary sectional view illustrating a modification.

FIGURE 4 is a view similar to FIGURE 1 but showing the parts in lowered or down position.

FIGURE 5 is a sectional view taken on the line 5—5 of FIGURE 4.

FIGURE 6 is a fragmentary plan view illustrating the present invention.

Referring in detail to the drawings, the numeral 10 indicates a portion of a vehicle such as a truck which includes the usual cab 11 and there is further provided the floor 12 as well as a rearwardly disposed platform 13. The numeral 14 indicates the usual transmission, and extending rearwardly from the transmission 14 is a shaft assembly 15 that is adapted to be used for providing power for the rear wheels of the vehicle in the usual manner so that the vehicle can be driven forwardly or rearwardly as desired.

Arranged contiguous to the transmission 14 is a power take-off 16, and the power take-off 16 is operatably connected to the transmission 14. Extending rearwardly from the power take-off 16 is a shaft 17, and the numeral 18 indicates a shaft which is coupled to the shaft 17 by means of a universal joint 19. A shaft or section 20 is arranged rearwardly of the shaft 18, and the shafts 20 and 18 are coupled together by means of the universal joint 21.

Mounted on the rear end of the shaft 20 is a pulley 22, and one or more endless belts 23 are trained over the pulley 22, and the belts 23 are also trained over a pulley 24 on a shaft 25. The shaft 25 is connected to a conventional electric welder 26 or other piece of equipment which is mounted on the platform 13 of the vehicle 10. The numeral 27 indicates a hook member which can be used for supporting the belts 23 when the parts are in the position shown in FIGURE 1 so that slack will be taken up in the belts 23 when the parts are in the raised position of FIGURE 1. However, when the mechanism 26 is to be operated, the parts are in the lowered position of FIGURE 4 for example, so that the belts 23 are out of engagement with the hook 27.

There is further provided a means for raising and lowering the driving connection, and this means comprises lugs 28 which depend from a beam 32 that forms part of the vehicle chassis or frame, and a support member 29 is pivotally or hingedly connected to the lugs 28 by means of a shaft or pivot pin 30. Bearings 31 extend upwardly from the support member 29, and the bearings 31 are connected to the shaft or section 20. Thus, as the support member 29 is raised or lowered, the shaft or section 20 and its associated parts will be raised or lowered. This arrangement permits the parts to be raised as for example when a vehicle is being driven along a highway, street or the like, so that the driving connection will not accidentally encounter obstacles, obstructions or the like so that breakage or damage to the parts will be prevented. However, when the mechanism 26 is to be powered or operated, the parts can be lowered as for example as shown in FIGURE 4 and since the vehicle 10 will be stationary or at rest when the parts are in the lowered position of FIGURE 4, it will be seen that there will be no possibility of the various members such as the pulley 22 striking an obstruction or other surface or member.

The means for pivoting or raising or lowering the support member 29 includes a vertically disposed hydraulic cylinder 33 which is mounted rearwardly of the cab 11, and a pump or jack 34 is provided for actuating the cylinder 33, there being a handle 35 for actuating or energizing the pump 34. The numeral 36 indicates a fluid reservoir, and the reservoir 36 as well as the pump 34 and cylinder 33 may be connected together by suitable conduits such as the conduits 37. A piston rod 38 depends from the cylinder 33, and the rod 38 has its lower end pivotally connected to the support member 29. Thus, by properly actuating the cylinder 33, the rod 38 can be raised or lowered so as to move or swing the support member 29 on its pivot pin 30 so that the parts such as the section 20 and the pulley 22 can be adjusted.

Extending upwardly from the support member 29 is an arm 39, and the arm 39 has its lower end connected to the support member 29 as at 40. The arm 39 is provided with an elongated slot 41, and a bolt and nut assembly 42 is connected to the slotted portion 41 of the arm 39. Thus, by loosening the wing nut on the bolt and nut assembly 42, the arm 39 is free to move up and down, and after the parts have been moved to their adjusted or desired position, the wing nut on the bolt and nut assembly 42 can be tightened so as to maintain the parts immobile in their desired position.

Referring to FIGURE 3 of the drawings, there is illustrated a slight modification wherein the numeral 26′ indicates a piece of equipment such as a welding machine which is adapted to have a shaft 25′ connected thereto, and the shaft 25′ has a pulley 24 thereon. As shown in FIGURE 3 for example the machine 26′ is adapted to be mounted below the seat 43 of the cab 11. Otherwise the construction and use of the apparatus of FIGURE 3 is the same as previously described in connection with the other figures.

From the foregoing, it is apparent that there has been provided a driving mechanism which is especially suitable for use in powering a piece of equipment such as the equipment 26 as for example when such equipment is mounted on the rear of a truck or other vehicle. According to the present invention, power from the transmission 14 which is operated by the vehicle engine in the usual manner, serves to actuate the power take-off 16 and the shaft 17 is rotated by the power take-off 16. As the shaft 17 is rotated, it turns the shaft 18 through the medium of the coupling 19, and rotation of the shaft 18 causes rotation of the section 20 by means of the coupling 21, and as the member 20 turns, it rotates the pulley 22 which has the belts 23 thereon, so that the belts 23 will move as the pulley 22 turns and this will cause rotation of the pulley 24 which in turn will rotate the shaft 25. The shaft 25 is connected to the conventional welder or other equipment 26 so that rotation of the shaft 25 will operate the welder 26 whereby various types of workpieces can be welded or otherwise worked on by suitably hooking up equipment to the machine 26.

When the machine 26 is being operated or powered, the parts are in the position shown in FIGURES 4 and 5 so that the parts are in lowered position. However, when the equipment 26 is not being operated, the parts are in the position of FIGURES 1 or 2. To move the parts from the position shown in FIGURE 4 to the position shown in FIGURE 1, it is only necessary to actuate the pump 34 by means of the handle 35 so that hydraulic fluid from the reservoir 36 can be pumped into the cylinder 33 whereby the piston rod 38 can be moved upwardly. Since the piston rod 38 has its lower end connected to the support member 29, the support member 29 will be raised. As these parts are moved upwardly, some slack will appear in the belts 23, and this slack can be taken up by suspending the belts on the hook member 27 as shown in FIGURE 1 for example. When the support member 29 and its associated parts are being raised, the wing nut on the assembly 42 is loosened, and after the parts have been raised to the desired elevation, this wing nut is tightened so as to help maintain the parts upwardly in their raised position until it is desired to again lower the mechanism.

By being able to selectively raise or lower the driving mechanism, it will be seen that when the vehicle is being driven along a street or other area, the parts can be moved to raised position so that the pulley 22 or the other parts will not strike any obstructions or the like. However, when the equipment 26 is to be used, the vehicle can be stopped so that the parts can be lowered and since the vehicle is stopped when the parts are in lowered position, there is no possibility of breaking or damaging the parts.

As shown in FIGURE 3, the welding machine or other eqiupment 26' may be arranged beneath the cab seat 43 instead of being supported on a platform such as the platform 13, and the shaft 25' which has the pulley 24 thereon can be used for supplying power to the equipment 26', in the same manner as previously described with the machine 26.

The parts can be made of any suitable material and in different shapes or sizes.

In the raised position, the belts 23 have a certain amount of slack, and the drive shaft and power take-off shaft are parallel in the raised position. As shown in FIGURE 3 the welder 26' may be arranged in the truck cab 11 or else it may be arranged in the back of the cab as shown in FIGURE 1 for example, and as indicated by the numeral 26. Suitable braces and bearings can be used wherever desired or required. The various pulleys and shafts are of a size so that the welder will be driven at the proper speed or r.p.m.

The shaft assembly can be raised or lowered as desired or required. Any suitable type of equipment can be operated, as for example a welder can be operated from a power take-off of a truck or other vehicle.

With the present invention, a welder, light plant, or any other equipment can be mounted behind the cab of a truck and can be operated from the same power take-off on the transmission. The power take-off is a high speed device and the shafting and pulley assembly are adapted to drop down when in use so that the parts are properly lined up with the power take-off and since the power take-off slants downwardly a slight amount, when the parts are in lowered operative position, there will be a minimum amount of vibration or rattle. When the device is not being used, it is moved upwardly by means of the hydraulic cylinder. The machine 26 may be of any suitable type or construction.

Minor changes in shape, size and rearrangement of details coming within the field of invention claimed may be resorted to in actual practice, if desired.

What is claimed is:

1. In a vehicle, a frame including at least one beam, a transmission at the front of the vehicle, a power take-off operably connected to said transmission, shaft means operatively connected to said power take-off, a pulley connected to said shaft means, said vehicle further including a cab and a rearwardly disposed platform, a power mechanism on said platform, a shaft connected to said power mechanism, a pulley on the front end of said last named shaft, and an endless belt trained over the first and second named pulleys, a hook member for at times supporting said belt, a support member pivotally connected to said beam and having bearings engaging said shaft means, and means for raising and lowering said support member, said means comprising a vertically disposed hydraulic cylinder mounted on said cab above and spaced from said support member, an actuating rod having one end working in said cylinder and having the other end pivotally connected to said support member, and a hand actuated pump mounted on said cab adjacent said cylinder and operatively connected to said cylinder.

2. The structure as defined in claim 1, and further including a holding bar extending upwardly from said support member, and releasable lock means on said vehicle operable to engage said holding bar when said support member is in the raised position.

References Cited in the file of this patent

UNITED STATES PATENTS

| 1,447,201 | Brown et al. | Mar. 6, 1923 |
| 2,630,872 | Roos et al. | Mar. 10, 1953 |
| 2,729,435 | Harbers et al. | Jan. 3, 1956 |